US012032369B2

(12) United States Patent
Luo et al.

(10) Patent No.: US 12,032,369 B2
(45) Date of Patent: Jul. 9, 2024

(54) METHOD, SOFTWARE SYSTEM, SERVER AND PHYSICAL TERMINAL OF ANALYTICAL CALCULATION OF POWER SUPPLY RELIABILITY INDEXES OF COMPLEX POWER DISTRIBUTION NETWORKS WITH MULTI-CONNECTIONS

(71) Applicant: Tianjin University, Tianjin (CN)

(72) Inventors: Fengzhang Luo, Tianjin (CN); Nan Ge, Tianjin (CN); Qiubo Zou, Tianjin (CN); Tianyu Zhang, Tianjin (CN); Chengshan Wang, Tianjin (CN); Jing Xu, Tianjin (CN); Shengyuan Wang, Tianjin (CN); Xuan Wu, Tianjin (CN); Jiacheng Fo, Tianjin (CN); Xiaoyu Qiu, Tianjin (CN); Kuangyu Kong, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/368,389

(22) Filed: Sep. 14, 2023

(65) Prior Publication Data

US 2024/0045419 A1 Feb. 8, 2024

(30) Foreign Application Priority Data

Sep. 14, 2022 (CN) .......................... 202211112381.3

(51) Int. Cl.
*G05B 23/02* (2006.01)
*G05B 19/042* (2006.01)
(Continued)

(52) U.S. Cl.
CPC ....... *G05B 23/0283* (2013.01); *G05B 19/042* (2013.01); *G06F 30/13* (2020.01); *H02J 3/00* (2013.01)

(58) Field of Classification Search
CPC .. G05B 15/02; G05B 23/0283; G05B 19/042; G06F 30/13; H02J 3/00
(Continued)

(56) References Cited

U.S. PATENT DOCUMENTS 6,549,880 B1 * 4/2003 Willoughby .............. H02J 3/00
700/286
10,025,337 B2 * 7/2018 Hancock ................ G06Q 50/06
(Continued)

FOREIGN PATENT DOCUMENTS

CN 105139082 A * 12/2015
CN 105406469 A * 3/2016
(Continued)

OTHER PUBLICATIONS

"Reliability and Weak Link Analysis of Power Distribution Systems: a case of Songjiang", Jiangxin Zhou et al., 2021 IEEE 4th International Electrical and Energy Conference (CIEEC), Aug. 17, 2021.

*Primary Examiner* — Ronald D Hartman, Jr.

(57) ABSTRACT

A method of analytical calculation of power supply reliability indexes of a power distribution network includes (A1) acquiring parameters of the power distribution network; (A2) building a reliability calculation model, which includes treating the power distribution network as a node-branch calculation unit and numbering nodes and branches in the power distribution network; (A3) building correlation matrices, and calculating a power supply path matrix and a tie-line matrix, wherein the correlation matrices are a node-branch association matrix, a section switch matrix and a fuse matrix; (A4) deriving a fault incidence matrix through the power supply path matrix, the section switch matrix, the fuse matrix and the tie-line matrix, and calculating the reliability indexes of the nodes and the power distribution network; and (A5) identifying vulnerable links by performing sensi- (Continued)

tivity analysis through partial derivative transformation for quantifiable parameters or perturbation transformation for unquantifiable parameters on an expression of the reliability indexes.

6 Claims, 5 Drawing Sheets

(51) Int. Cl.
  *G06F 30/13* (2020.01)
  *H02J 3/00* (2006.01)
(58) Field of Classification Search
  USPC .......................................................... 700/292
  See application file for complete search history.

(56) References Cited

U.S. PATENT DOCUMENTS

| | | | |
|---|---|---|---|
| 2018/0240202 A1* | 8/2018 | Sheng | G06Q 50/06 |
| 2018/0247001 A1* | 8/2018 | Liu | G06F 16/955 |
| 2021/0117586 A1* | 4/2021 | Wu | G05B 19/042 |
| 2023/0186409 A1* | 6/2023 | Akke | G06Q 10/063 |
| | | | 700/295 |

FOREIGN PATENT DOCUMENTS

| | | | | |
|---|---|---|---|---|
| CN | 106600145 A | * | 4/2017 | |
| CN | 107679745 A | * | 2/2018 | ....... G06Q 10/06393 |
| CN | 108921725 A | | 11/2018 | |
| CN | 110009240 A | * | 7/2019 | ....... G06Q 10/06393 |
| CN | 107681691 B | * | 1/2020 | |

\* cited by examiner

Derive the Partial Derivative Expression for this Index → Multiplication of Each Fault Parameter with Corresponding Row in $IF_1$ → Expanding the Multiplication Structure According to Matrix Algebra Rules → Partial Derivative Operation Result is Dependent Only on the $i$-th Term → Obtaining the Result after Partial Derivation $$\frac{\partial SAIFI}{\partial \lambda_i} = \frac{\partial \left\{ [1 \ 1 \ \cdots \ 1] \times diag(\lambda_1 \ \lambda_2 \ \cdots \ \lambda_N) \times IF_1 \times \frac{N^T}{N_{total}} \right\}}{\partial \lambda_i}$$

$$= \frac{\partial \left\{ [\lambda_1 \ \lambda_2 \ \cdots \ \lambda_N] \times \begin{bmatrix} IF_1^{1,:} \\ IF_1^{2,:} \\ \vdots \\ IF_1^{N,:} \end{bmatrix} \right\} \times \frac{N^T}{N_{total}}}{\partial \lambda_i}$$

$$= \frac{\partial \left( \lambda_1 \times IF_1^{1,:} + \lambda_2 \times IF_1^{2,:} + \cdots + \lambda_N \times IF_1^{N,:} \right)}{\partial \lambda_i} \times \frac{N^T}{N_{total}}$$

$$= \frac{\partial \left( \lambda_i \times IF_1^{i,:} \right)}{\partial \lambda_i} \times \frac{N^T}{N_{total}}$$

$$= IF_1^{i,:} \times \frac{N^T}{N_{total}}$$

Fig. 2

METHOD, SOFTWARE SYSTEM, SERVER AND PHYSICAL TERMINAL OF ANALYTICAL CALCULATION OF POWER SUPPLY RELIABILITY INDEXES OF COMPLEX POWER DISTRIBUTION NETWORKS WITH MULTI-CONNECTIONS

CROSS REFERENCE OF RELATED APPLICATION

The present invention claims priority under 35 U.S.C. 119(a-d) to CN 202211112381.3, filed Sep. 14, 2022.

BACKGROUND OF THE PRESENT INVENTION

Field of Invention

This invention belongs to the field of electric power distribution technology, particularly relating to a method, software system, server and physical terminal of analytical calculation of power supply reliability indexes of complex power distribution networks with multi-connections

Description of Related Arts

As the last link of the power system directly facing the end user, the power distribution system is mainly responsible for supplying and distributing electric energy to the electric load. Because the power generation, transmission, distribution and consumption are carried out at the same time, if a link or a component of the power distribution system fails and exits operation, it is usually accompanied by the interruption of the power supply to the user, and at this time, the power supply to the user is able to be restored only by taking corresponding measures or repairing the fault. The impact of power systems on their connected users and load supply capacity and supply quality is mainly manifested in the distribution system. The effectiveness of the distribution system is directly related to the reliability and quality of electricity supply for a large number of users. Therefore, the distribution system holds a crucial position within the power system, and evaluating the reliability of the distribution system is of significant importance.

At present, there are many methods to evaluate reliability indexes of the power distribution system and correlational studies are relatively mature. These methods include two categories of the simulation method and the analytical method. The simulation method generally includes simulating the process of failure, maintenance or withdrawal of components or devices in the power distribution system through Monte Carlo simulation, but this method is unable to achieve the explicit expression of reliability indexes. The typical analytical method is the failure mode and effect analysis method, which includes calculating reliability indexes by enumerating fault conditions and effects of all components. However, the process of traversal cyclic search is rather complicated, and it is difficult to be applied to large-scale power distribution network analysis. On this basis, although the network equivalent method, the minimum path method and the fault diffusion method simplify the calculation to a certain extent, and is able to analyze and express the relationship between fault events and reliability indexes, these analytical and calculation methods are still very complicated in the face of a large-scale power distribution system. Chinese patent CN 108595382 B, entitled "A calculation method of structural sensitivity of power distribution system based on the fault incidence matrix" and the paper published in IEEE TRANSACTIONS ON POWER SYSTEMS titled "Fault Incidence Matrix Based Reliability Evaluation Method for Complex Distribution System" disclose that the method includes steps of building a section connection unit, building a fault incidence matrix in each section connection unit to describe the influence of branch faults on corresponding nodes, and calculating reliability indexes through algebraic operations of matrices, thus greatly improving the computational efficiency. However, this method has some limitations and is only applicable to a single radial feeder line. With the expansion of the scale of the power grid, most of the current power distribution networks contain multiple feeder lines and multiple tie-lines, the connection of these lines is complicated, so that the above method still needs multiple repeated calculations, and is unable to achieve the analytical expression of reliability indexes of the power distribution system with multi-connections through one-time analytical calculation. The problem that how to establish the association model for the complex power distribution system with multi-connections, propose a new algorithm, and realize the analytical calculation of reliability indexes of the complex power distribution system with multi-connections through one-time analytical calculation, is still not solved.

SUMMARY OF THE PRESENT INVENTION

An object of the present invention is to provide a method, software system, server and physical terminal of analytical calculation of power supply reliability indexes of complex power distribution networks with multi-connections. By establishing a new reliability calculation model, the position and state of each component in the power distribution system with multi-connections are described in the form of matrix, and power supply reliability indexes of the power distribution system are analyzed and calculated by matrix operations, the method provided by the present invention is able to achieve the analytic expression of the reliability indexes of the power distribution network.

To achieve the above object, the present invention adopts technical schemes as follows.

A method of analytical calculation of power supply reliability indexes of a power distribution network with multi-connections comprises steps of.

(A1) acquiring parameters of the power distribution network, wherein the parameters are network topology connection relationship, failure rate, failure repair time, switch operation time and node load demand;

(A2) building a reliability calculation model, which comprises treating the power distribution network as a node-branch calculation unit and numbering nodes and branches in the power distribution network;

(A3) building correlation matrices, and calculating a power supply path matrix and a tie-line matrix, wherein the correlation matrices are a node-branch association matrix, a section switch matrix and a fuse matrix;

(A4) deriving a fault incidence matrix through the power supply path matrix, the section switch matrix, the fuse matrix and the tie-line matrix, and calculating the reliability indexes of the nodes and the power distribution network; and (A5) identifying vulnerable links by performing sensitivity analysis through partial derivative transformation for quantifiable parameters or perturbation transformation for unquantifiable parameters on an expression of the reliability indexes.

Further, in the step (A2), the reliability calculation model is a node-branch association model, wherein section switches and fuses are regarded as special branches, two ends of each of branches are respectively connected with two load nodes, the each of branches is provided between every two adjacent load nodes; if there is no load node at one end of one of the branches, a load node where both the number of users and node load demand are zero is added; for a low-voltage transformer connected with the users, the failure rate of the low-voltage transformer is merged into a circuit where the transformer is located.

Further, the step (A3) specifically comprises:

(A31) according to the node-branch association model, searching all the nodes and branches of the power distribution network by depth first search algorithm once and simultaneously determining a branch direction of an oriented graph, numbering the nodes and the branches, writing the node-branch association matrix, and partitioning the node-branch association matrix according to feeder lines, wherein elements of the node-branch association matrix are defined as $e_{ij}$ which has three values of −1, 0 and 1, when a node i is disconnected from a branch j, $e_{ij}=0$; when the node i is a starting point of the branch j, $e_{ij}=1$; when the node i is a terminal point of the branch j, $e_{ij}=-1$;

(A32) obtaining the power supply path matrix of all load nodes, which comprises based on the node-branch association matrix, deleting a row corresponding to a power node and a column corresponding to a tie-line, and performing matrix inversion; and (A33) according to locations of components in the power distribution network, writing the section switch matrix and the fuse matrix, and calculating the tie-line matrix based on the section switch matrix, the fuse matrix and the node-branch association matrix.

Further, the step (A4) specifically comprises:

(A41) defining four influence types of a branch fault on the load node, wherein the four influence types are type-a, type-b, type-c and type-d respectively; type-a means that all power supply paths of a load are disconnected when the branch fault occurs, and the load is restored to be supplied only after the branch fault is repaired; type-b means that all power supply paths of the load are disconnected when the branch fault occurs, and the load is restored to be supplied by a main power supply after the branch fault is isolated; type-c means that all power supply paths of the load are disconnected when the branch fault occurs, the load is restored to be supplied by a standby power supply; and type-d means that the branch fault has no effect on the load node;

(A42) according to elements at corresponding positions of the node-branch association matrix, the section switch matrix, the fuse matrix and the tie-line matrix, determining the influence type of any branch fault on any node;

(A43) setting a row vector consisting of failure rates of N branches in the power distribution network as $\lambda=[\lambda_1\ \lambda_2\ \lambda_3 \ldots \lambda_N]$, a row vector consisting of failure repair time of the N branches in the power distribution network as $\mu=[\mu_1\ \mu_2\ \mu_3 \ldots \mu_N]$, a row vector consisting of node load demands in the power distribution network as $L=[L_1\ L_2\ L_3 \ldots L_N]$, a row vector consisting of node interruption frequency indexes caused by the branch fault as $\lambda^{LP}$ $[\lambda_1^{LP}\ \lambda_2^{LP}\ \lambda_3^{LP} \ldots \lambda_N^{LP}]$, a row vector consisting of node interruption duration indexes as $\mu^{LP}=[\mu_1^{LP}\ \mu_2^{LP}\ \mu_3^{LP} \ldots \mu_N^{LP}]$, and a row vector consisting of node power loss indexes as $ens^{LP}=[ens_1^{LP}\ ens_2^{LP}\ ens_3^{LP} \ldots ens_N^{LP}]$, all of which are calculated by matrix operations as follows:

$$\begin{cases} \lambda^{LP} = [1\ 1\ \ldots\ 1] \times \mathrm{diag}(\lambda_1\ \lambda_2\ \ldots\ \lambda_N) \times IF_1 \\ \mu^{LP} = [1\ 1\ \ldots\ 1] \times \mathrm{diag}(\lambda_1\ \lambda_2\ \ldots\ \lambda_N) \times IF_2 \\ \quad ens^{LP} = \mu^{LP} \circ L \\ IF_2 = \mathrm{diag}(\mu_1\ \mu_2\ \ldots\ \mu_N) \times IF_3 + IF_4 \end{cases} \quad (1)$$

here, [1 1 . . . 1] represents an N-dimensional row vector whose elements are all 1, an operative symbol "∘" represents Hadamard product, and an operational rule is to multiply elements at corresponding positions of matrices or vectors, wherein:

during calculating $\lambda^{LP}$ the IF matrix is transformed according to following rules that: a value of 1 is assigned to positions in the IF matrix where an element corresponds to 'type-a', 'type-b' or 'type-c', and a value of 0 is assigned to positions where an element corresponds to 'type-d', so that the transformed IF matrix is defined as an $IF_1$ matrix, here, an element at the $i^{th}$ row and $j^h$ column in the $IF_1$ matrix represents an interruption frequency at a node j when a branch i fails; while calculating $\mu^{LP}$ an $IF_2$ matrix is obtained through calculation of an $IF_3$ matrix and an $IF_4$ matrix;

the $IF_3$ matrix is obtained by assigning a value of 1 to positions in the IF matrix where the element corresponds to 'type-a', and assigning a value of 0 to positions where the element corresponds to 'type-b', 'type-c' or 'type-d', so that the transformed IF matrix is defined as the $IF_3$ matrix, here, an element at the $i^{th}$ row and $j^{th}$ column in the $IF_3$ matrix represents an interruption duration at the node j due to the type-a influence when the branch i fails;

the $IF_4$ matrix is obtained by assigning a value of $t_{sw}$ to positions in the IF matrix where the element corresponds to 'type-b', assigning a value of $\max\{t_{sw},t_{op}\}$ to positions where the element corresponds to 'type-c', and assigning a value of 0 to positions where the element corresponds to 'type-a' and 'type-d', so that the transformed IF matrix is defined as the $IF_4$ matrix, here, an element at the $i^{th}$ row and $j^{th}$ column in the $IF_4$ matrix represents an interruption duration at the node j due to the type-b and type-c influences when the branch i fails, $t_{sw}$ represents an operation time of a section switch, and $t_{op}$ represents an operation time of a tie switch; and (A44) calculating the reliability indexes of the power distribution network by a formula of:

$$\begin{cases} SAIFI = \lambda^{LP} \times \dfrac{N^T}{N_{total}} \\ SAIDI = \mu^{LP} \times \dfrac{N^T}{N_{total}} \\ EENS = \sum ens_i^{LP} = \mu^{LP} \times L^T \end{cases} \quad (2)$$

here, $N^T$ represents a column vector consisting of the number of users at each load node arranged in order of number from small to large, and $N_{total}$ represents the total number of users in the power distribution network.

Further, in the step (A5), performing partial derivative transformation specifically comprises listing a partial derivative expression, multiplying each fault parameter and each row of the $IF_1$, and performing matrix multiplication expansion; for unquantifiable parameters, differences of the fault incidence matrix IF and the reliability indexes before and after transformation to obtain the sensitivity.

Also, the present invention provides a system of analytical calculation of power supply reliability indexes of a power distribution network, the system comprises a network parameter acquisition module, a reliability calculation model building module, a correlation matrix building module, a reliability index calculation module and a sensitivity acquisition module, wherein the network parameter acquisition module is configured to obtain parameters of the power distribution network, the parameters are network topology connection relationship, failure rate, failure repair time, switch operation time and node load demand; the reliability calculation model building module is configured to treat the power distribution network as a node-branch calculation unit, and number nodes and branches of the power distribution network; the correlation matrix building module is configured to build correlation matrices, and calculate a power supply path matrix and a tie-line matrix, the correlation matrices are a node-branch association matrix, a section switch matrix and a fuse matrix; the reliability index calculation module is configured to derive a fault incidence matrix through the power supply path matrix, the section switch matrix, the fuse matrix and the tie-line matrix, and to calculate reliability indexes of the nodes and the power distribution network; the sensitivity acquisition module is configured to perform sensitivity analysis through partial derivative transformation for quantifiable parameters or perturbation transformation for unquantifiable parameters on an expression of the reliability indexes to identify vulnerable links.

Further, the present invention provides a server of analytical calculation of power supply reliability indexes of a power distribution network, the server comprises a memory and a processor, wherein the memory is configured to store a computer program, and the processor is configured to analyze and calculate the reliability indexes of the power distribution network while executing the computer program stored in the memory.

Further, the present invention provides a terminal of analytical calculation of power supply reliability indexes of a power distribution network, the terminal comprises a memory and a processor, wherein the memory is configured to store a program which supports the processor to analyze and calculate the reliability indexes of the power distribution network, and the processor is configured to execute the program stored in the memory.

Compared with the prior art, the method, software system, server and physical terminal of analytical calculation of power supply reliability indexes of the power distribution network with multi-connections provided by the present invention have some advantages as follows.

According to the present invention, the complex power distribution network is treated as the node-branch association model; the node-branch association matrix, the section switch matrix, the fuse matrix, the power supply path matrix and the tie-line matrix are built; according to elements at corresponding positions of correlation matrices, the influence types of all branch faults on all nodes are determined, and the fault incidence matrix is obtained for further calculating the reliability indexes of the power distribution network. Moreover, the method provided by the present invention realizes the analytical calculation and explicit expression of the reliability indexes, avoids the complicated calculation and repeated search process, and improves the computational efficiency. In this method, the sensitivity is calculated by partial derivative transformation or perturbation transformation of the expression of the reliability indexes, the vulnerable links affecting the reliability improvement are identified, which is able to provide a certain reference for the improvement of the power supply reliability of the power distribution network.

BRIEF DESCRIPTION OF THE DRAWINGS

FIG. 2 is a flow chart of a step (A5) of the method provided by the present invention.

DETAILED DESCRIPTION OF THE PREFERRED EMBODIMENT

It should be noted that the characteristics in the different embodiments provided by the present invention are able to be combined with each other without conflict.

The following detailed description of the invention will be provided with reference to the accompanying drawings and in conjunction with exemplary embodiments.

The present invention provides a method of analytical calculation of power supply reliability indexes of a power distribution network. The method comprises steps of:

(A1) obtaining parameters of the power distribution network, wherein the parameters are network topology connection relationship, failure rate, failure repair time, switch operation time and node load demand; and (A2) building a reliability calculation model, which comprises treating the power distribution network as a node-branch calculation unit and numbering nodes and branches of the power distribution network, wherein:

the power distribution network is generally in a mode of "closed-loop design and open-loop operation", here, the closed-loop design means that the power distribution network is a closed-loop network formed by connection of tie-lines, and a tie switch is a normally open switch, which is generally in a disconnected state under normal operation, and is closed only when a fault occurs on one feeder line where the tie switch is provided for transferring a power failure load on the one feeder line to other feeder lines;

the reliability calculation model is a node-branch association model in which distribution switches such as section switches and fuses are regarded as special branches, two ends of each of branches are respectively connected with two load nodes, the each of branches is provided between every two adjacent load nodes; if there is no load node at one end of one of the branches, a load node where both the number of users and node load demand are zero is added; for a low-voltage transformer connected with the users, the failure rate of the transformer is merged into a circuit where the transformer is located.

In the node-branch association model, distribution switches such as section switches and fuses are regarded special branches, two ends of each of branches are respectively connected with two load nodes, a branch is provided between every two adjacent load nodes, which facilitates the establishment of the node-branch association matrix E to describe a structure of the power distribution network. If there is no load node at one end of the branch, a load node where the number of users and node load demands are zero is added; for a low-voltage transformer connected with a user, the failure rate of the transformer is merged into a circuit where the transformer is located.

Figure 1:
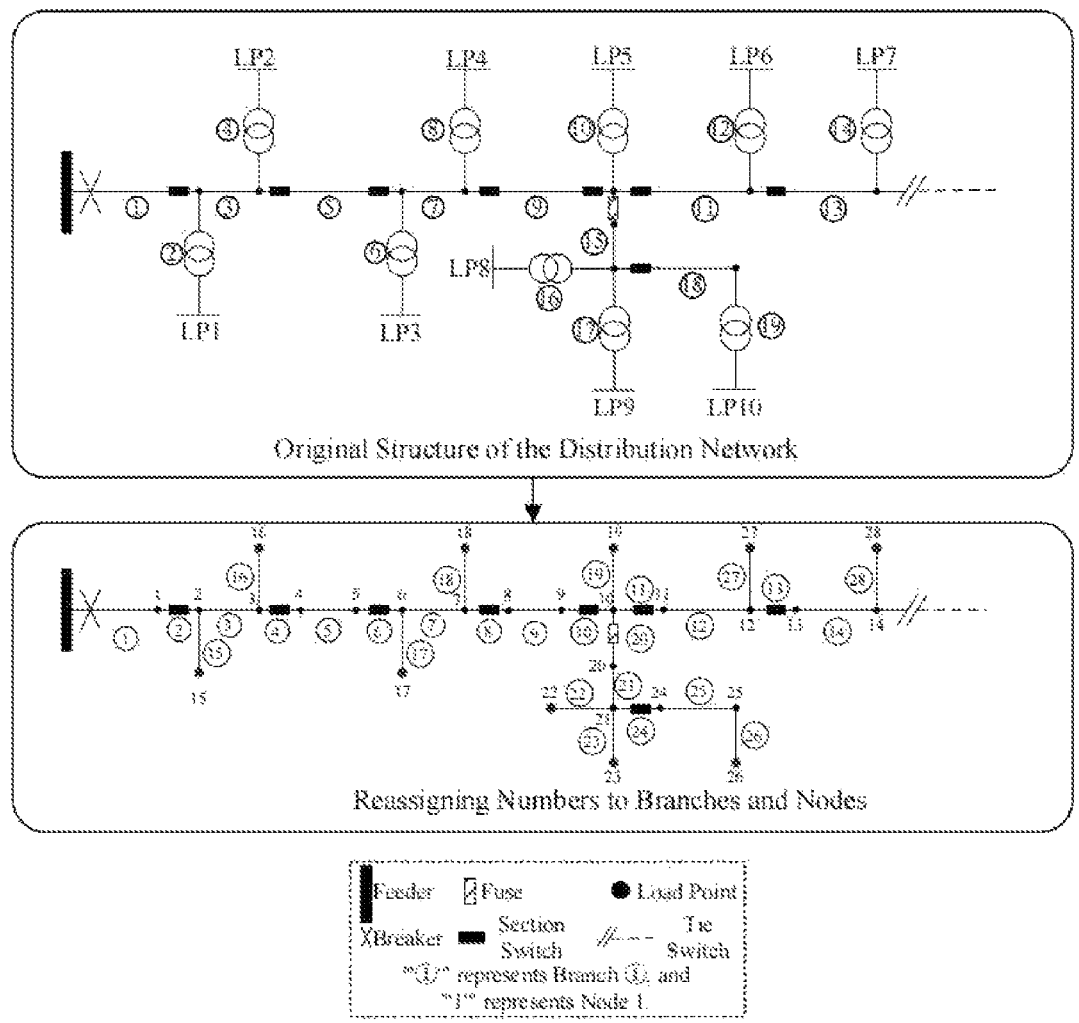
FIG. 1 depicts a step (A2) in constructing a reliability calculation model using an analytical method for reliability indices in a power distribution network, as provided by the present invention.
Figure 3:
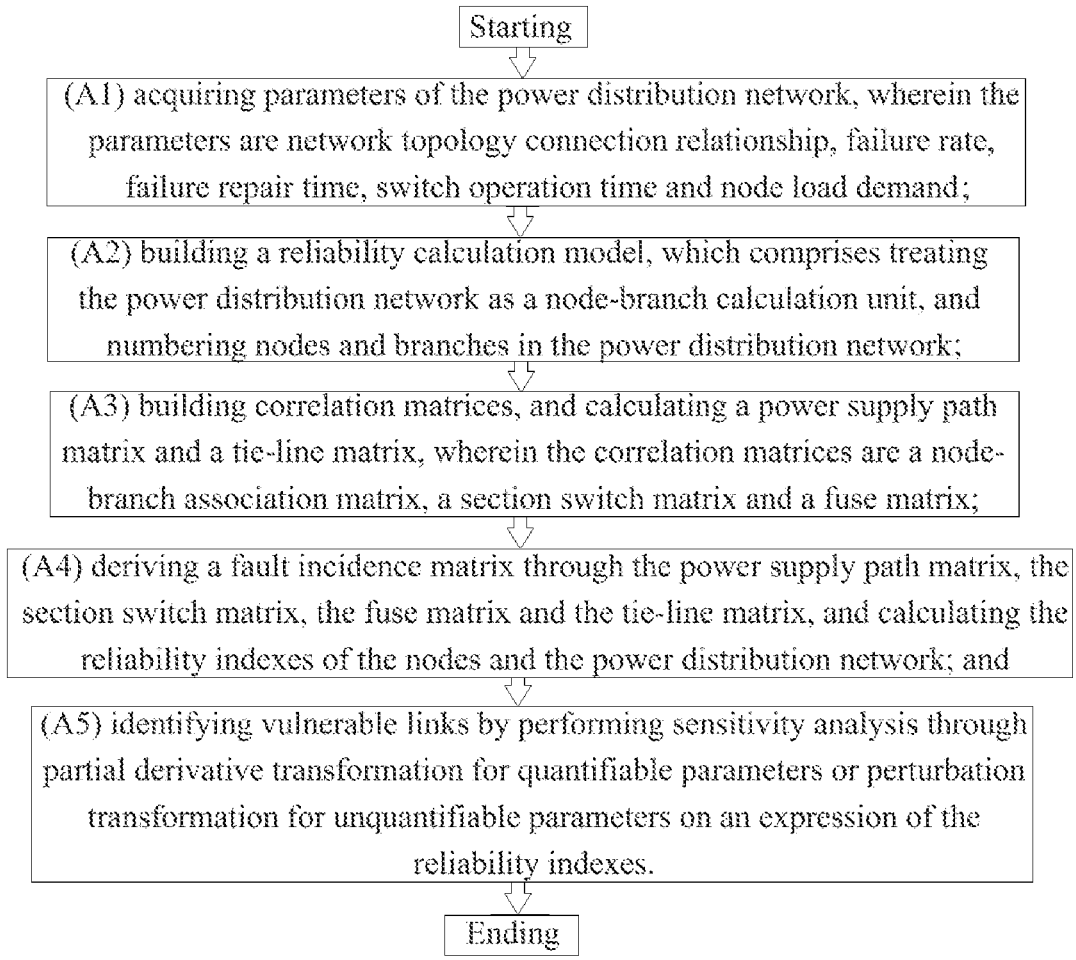
FIG. 3 is a flow chart of a method of analytical calculation of power supply reliability indexes of a power distribution network with multi-connections provided by the present invention.

FIG. 1 depicts a step (A2) in constructing a reliability calculation model using an analytical method for reliability indices in a power distribution network, as provided by the present invention, in which the power distribution network is treated as the node-branch calculation unit, and nodes and branches are numbered for building the reliability calculation model. The step (A2) specifically comprises:

(a1) finding a branch which is equipped with a low-voltage transformer connected with a user, adding a failure rate of the low-voltage transformer to a failure rate of the branch equipped with the low-voltage transformer, and removing the transformer, wherein referring to FIG. 1, low-voltage transformers are respectively set on branches ②④⑥⑧⑩⑫⑭⑯ ⑰⑲ of an original power distribution network;

(a2) treating section switches and a fuse in the original power distribution network as special branches, wherein two ends of each of branches are defined as load nodes and each branch is provided between every two adjacent load nodes; referring to FIG. 1, in the reliability calculation model, branches ②④⑥⑧ ⑩⑪⑬⑳㉔ represent the section switches or fuse respectively, nodes 1, 2, 3, 4, 5, 6, 7, 8, 9, 10, 11, 12, 13, 14, 20, 21, 24, 25 are added nodes for ensuring that two ends of each branch are connected with load nodes, and nodes 15, 16, 17, 18, 19, 22, 23, 26, 27, 28 are original nodes at which users and power demands are provided in the original power distribution network; and (a3) renumbering the nodes and the branches, wherein according to a current direction, a numbering of each branch is consistent with a numbering of a tail node of the each branch, that is, the tail node of the branch ① is node 1, and the tail node of the branch ② is node 2.

The method further comprises (A3) building correlation matrices, and calculating a power supply path matrix PSPM and a tie-line matrix TIE, wherein the correlation matrices are a node-branch association matrix E, a section switch matrix SE and a fuse matrix FUSE'.

The step (A3) specifically comprises (A31) according to the node-branch association model, searching all nodes and branches of the power distribution network by depth first search algorithm once and simultaneously determining a branch direction of an oriented graph, numbering the nodes and the branches, writing the node-branch association matrix E, partitioning the node-branch association matrix E according to the feeder lines, wherein elements of the node-branch matrix E are defined as $e_{ij}$ which has three values of −1, 0 and 1, when the node i is disconnected from a branch j, $e_{ij}=0$; when the node i is a starting point of the branch j, $e_{ij}=1$; when the node i is a terminal point of the branch j, $e_{ij}=-1$; (A32) obtaining the power supply path matrix PSPM of all load nodes, which comprises based on the node-branch association matrix E, deleting a row corresponding to a power node and a column corresponding to a tie-line, and performing matrix inversion; and (A33) according to locations of components in the power distribution network, writing the section switch matrix SE and the fuse matrix FUSE', and calculating the tie-line matrix TIE based on the section switch matrix SE, the fuse matrix FUSE' and the node-branch association matrix E.

The node-branch association matrix E is as follows:

$$[P \mid Q] = \begin{bmatrix} P_1 & 0 & \cdots & 0 & Q_1 \\ 0 & P_2 & \cdots & 0 & Q_2 \\ \vdots & \vdots & \ddots & \vdots & \vdots \\ 0 & 0 & \cdots & P_n & Q_n \end{bmatrix}, \quad (3)$$

here, a partitioned matrix Q represents the connection relationship between the tie-lines and the nodes, and is expressed as [column$_1$ column$_2$ ... column$_m$] by column which is denoted as:

$$Q' = \bigcup_{1 \le i \le m} \text{column}_i = [Q'_1 \ Q'_2 \ \cdots \ Q'_N]^T, \quad (4)$$

here, Q' is N-dimensional column vector, an $i^{th}$ element $Q_i'=1$ represents that a tie-line is connected with a node i, $Q_i'=0$ represents that no tie-line is connected with the node i, a Boolean operator "U" in a formula (4) is defined as the bitwise "or" operation of all vectors column; satisfying 1≤i≤m, that is, an element in the N-dimnensional colunm vector Q' is "0" or "1" which is obtained by the "or" operation of elements at corresponding locations of all vectors column; satisfying 1≤i≤m.

An N-dimensional diagonal matrix consisting of N elements in the N-dimensional column vector Q' is defined as Q'', that is, Q''=diag(Q$_1$', Q$_2$', ... Q$_N$'), then $$Q''=Q' \times [1 \ 1 \ \cdots \ 1] \circ E_N \quad (5),$$

here, [1 1 . . . 1] is an N-dimensional vector with all elements of 1, $E_N$ is an N-order identity matrix.

After performing a bitwise OR operation on the matrix SE and the matrix FUSE, a Hadamard product with the matrix PSPM is done to obtain a matrix PSE, which is expressed by a formula of $$PSE = (SE \cup FUSE) \circ PSPM = \begin{bmatrix} PSE_1 & 0 & \cdots & 0 \\ 0 & PSE_2 & \cdots & 0 \\ \vdots & \vdots & \ddots & \vdots \\ 0 & 0 & \cdots & PSE_n \end{bmatrix}, \quad (6)$$

here, an $i^{th}$ row and a $j^{th}$ column element of the matrix PSE is $PSE_{i,j}=SE_{i,j} \times PSPM_{i,j}$. When $PSE_{i,j}=1$, the branch i is an upstream branch of the node j, and there is a section switch (or fuse) between the branch i and the node j. When $PSE_{i,j}=0$, the branch i is not the upstream branch of the node j, and there is no section switch (or fuse) between the branch i and the node j.

The matrix Q'' is premultiplied by the matrix PSE to obtain a matrix PSE' as follows.

$$PSE' = PSE \times Q'' = \begin{bmatrix} PSE'_1 & 0 & \cdots & 0 \\ 0 & PSE'_2 & \cdots & 0 \\ \vdots & \vdots & \ddots & \vdots \\ 0 & 0 & \cdots & PSE'_n \end{bmatrix} \quad (7)$$

here, an $i^{th}$ row and a $j^{th}$ column element of the matrix PSE' is $PSE_{i,j}'=PSE_{i,j} \times Q_j''$. When $PSE_{i,j}'=1$, the branch i is an upstream branch of the node j, and there is a section switch (or fuse) between the branch i and the node j. When $PSE_{i,j}'=0$, the branch i is not the upstream branch of the node j, there is no section switch (or fuse) between the branch i and the node j, and no tie-line is provided on the node j.

The matrix PSE' is divided by column and is divided into blocks by feeder lines as follows.

$$PSE' = \left[ \underbrace{[c_1 \; c_2 \; \cdots \; c_{N_1}]}_{\S_1} \middle| \underbrace{[c_{N_1+1} \; c_{N_1+2} \; \cdots \; c_{N_1+N_2}]}_{\S_2} \middle| \cdots \middle| \underbrace{[\cdots \; \cdots \; \cdots \; c_N]}_{\S_n} \right], \quad (8)$$

wherein a branch set in an $i^{th}$ feeder partition is defined as $\Omega_i$. According to a partition situation, the tie-line matrix TIE is calculated. Based on the definition of the tie-line matrix TIE, it is able to be known that column vectors in each feeder partition of the tie-line matrix TIE are the same. It is supposed that the column vector of the $i^{th}$ feeder partition is tie, which is expressed by a formula of $$tie_i = \bigcup_{c_j \in \Omega_i} c_j, \text{ then} \quad (9)$$

$$TIE = [tie_1 \; tie_1 \; \cdots \; tie_1 | tie_2 \; tie_2 \; \cdots \; tie_2 | \cdots | \cdots \; \cdots \; \cdots \; tie_n]. \quad (10)$$

The method further comprises (A4) deriving a fault incidence matrix IF through the power supply path matrix PSPM, the section switch matrix SE, the fuse matrix FUSE' and the tie-line matrix TIE, and calculating the reliability indexes of the nodes and the power distribution network.

In the step (A4), based on elements at corresponding positions in the matrices PSPM, SE, FUSE' and TIE, a matrix on a main diagonal of the fault incidence matrix IF is able to be obtained through the relationship between the characteristic formula and the fault influence type in Table 1. When a node and a fault branch are in different feeder lines, the value of fault influence type must be d, so all elements on the non-principal diagonal in the matrix are type-d, thus a complete fault incidence matrix IF is obtained. In Table 1, the values of 'a', 'b', 'c' and 'd' correspond to the influence types 'type-a', 'type-b', 'type-c' and 'type-d' respectively, and "x" indicates an impossible characteristic formula.

TABLE 1

Fault influence types corresponding to different characteristic formulas

| | | | |
|---|---|---|---|
| a: (0, 0, 0, 0) | b: (0, 1, 0, 0) | a: (1, 0, 0, 0) | a: (1, 1, 0, 0) |
| a: (0, 0, 0, 1) | b: (0, 1, 0, 1) | a: (1, 0, 0, 1) | c: (1, 1, 0, 1) |
| a: (0, 0, 1, 0) | b: (0, 1, 1, 0) | a: (1, 0, 1, 0) | a: (1, 1, 1, 0) |

TABLE 1-continued

Fault influence types corresponding to different characteristic formulas

| | | | |
|---|---|---|---|
| a: (0, 0, 1, 1) | b: (0, 1, 1, 1) | a: (1, 0, 1, 1) | c: (1, 1, 1, 1) |
| d: (0, 0, −1, 0) | d: (0, 1, −1, 0) | x (1, 0, −1, 0) | x (1, 1, −1, 0) |
| d: (0, 0, −1, 1) | d: (0, 1, −1, 1) | x (1, 0, −1, 1) | x (1, 1, −1, 1) |

The step (A4) specifically comprises:

(A41) defining four influence types of a branch fault on the load node, wherein the four influence types are type-a, type-b, type-c and type-d respectively; type-a means that all power supply paths of a load are disconnected when the branch fault occurs, and the load is restored to be supplied only after the branch fault is repaired; type-b means that all power supply paths of the load are disconnected when the branch fault occurs, and the load is restored to be supplied by a main power supply after the branch fault is isolated; type-c means that all power supply paths of the load are disconnected when the branch fault occurs, the load is restored to be supplied by a standby power supply; and type-d means that the branch fault has no effect on the load node;

(A42) according to elements at corresponding positions of the node-branch association matrix E, the section switch matrix SE, the fuse matrix FUSE' and the tie-line matrix TIE, determining the influence type of any branch fault on any node;

(A43) setting a row vector consisting of failure rates of N branches in the power distribution network as $\lambda=[\lambda_1 \; \lambda_2 \; \lambda_3 \; \ldots \; \lambda_N]$, a row vector consisting of failure repair time of the N branches in the power distribution network as $\mu=[\mu_1 \; \mu_2 \; \mu_3 \; \ldots \; \mu_N]$, a row vector consisting of node load demands in the power distribution network as $L=[L_1 \; L_2 \; L_3 \; \ldots \; L_N]$, a row vector consisting of node interruption frequency indexes caused by the branch fault as $\lambda^{LP}$ $[\lambda_1^{LP} \; \lambda_2^{LP} \; \lambda_3^{LP} \; \ldots \; \lambda_N^{LP}]$, a row vector consisting of node interruption duration indexes as $\mu^{LP}=[\mu_1^{LP} \; \mu_2^{LP} \; \lambda_3^{LP} \; \ldots \; \mu_N^{LP}]$, and a row vector consisting of node power loss indexes as $ens^{LP}=[ens_1^{LP} \; ens_2^{LP} \; ens_3^{LP} \; \ldots \; ens_N^{LP}]$, all of which are calculated by matrix operations as follows:

$$\begin{cases} \lambda^{LP} = [1 \; 1 \; \cdots \; 1] \times \text{diag}(\lambda_1 \; \lambda_2 \; \cdots \; \lambda_N) \times IF_1 \\ \mu^{LP} = [1 \; 1 \; \cdots \; 1] \times \text{diag}(\lambda_1 \; \lambda_2 \; \cdots \; \lambda_N) \times IF_2 \\ \quad ens^{LP} = \mu^{LP} \circ L \\ IF_2 = \text{diag}(\mu_1 \; \mu_2 \; \cdots \; \mu_N) \times IF_3 + IF_4 \end{cases} \quad (1)$$

here, $[1 \; 1 \; \ldots \; 1]$ represents an N-dimensional row vector whose elements are all 1, an operative symbol "∘" represents Hadamard product, and an operational rule is to multiply elements at corresponding positions of matrices or vectors, wherein:

during calculating $\lambda^{LP}$ the IF matrix is transformed according to following rules that: a value of 1 is assigned to positions in the IF matrix where an element corresponds to 'type-a', 'type-b' or 'type-c', and a value of 0 is assigned to positions where an element corresponds to 'type-d', so that the transformed IF matrix is defined as an $IF_1$ matrix, here, an element at the $i^{th}$ row and $j^{th}$ column in the $IF_1$ matrix represents an interruption frequency at a node j when a branch i fails; while calculating $\mu^{LP}$ an $IF_2$ matrix is obtained through calculation of an $IF_3$ matrix and an $IF_4$ matrix;

the $IF_3$ matrix is obtained by assigning a value of 1 to positions in the IF matrix where the element corresponds to 'type-a', and assigning a value of 0 to positions where the element corresponds to 'type-b', 'type-c' or 'type-d', so that the transformed IF matrix is defined as the $IF_3$ matrix, here, an element at the $i^{th}$ row and $j^{th}$ column in the $IF_3$ matrix represents an interruption duration at the node j due to the type-a influence when the branch i fails;

the $IF_4$ matrix is obtained by assigning a value of $t_{sw}$ to positions in the IF matrix where the element corresponds to 'type-b', assigning a value of $\max\{t_{sw},t_{op}\}$ to positions where the element corresponds to 'type-c', and assigning a value of 0 to positions where the element corresponds to 'type-a' and 'type-d', so that the transformed IF matrix is defined as the $IF_4$ matrix, here, an element at the $i^{th}$ row and $j^{th}$ column in the $IF_4$ matrix represents an interruption duration at the node j due to the type-b and type-c influences when the branch i fails, $t_{sw}$ represents an operation time of a section switch, and $t_{op}$ represents an operation time of a tie switch; and (A44) calculating the reliability indexes of the power distribution network by a formula of:

$$\begin{cases} SAIFI = \lambda^{LP} \times \dfrac{N^T}{N_{total}} \\ SAIDI = \mu^{LP} \times \dfrac{N^T}{N_{total}} \\ EENS = \sum ens_i^{LP} = \mu^{LP} \times L^T \end{cases} \quad (2)$$

here, $N^T$ represents a column vector consisting of the number of users at each load node arranged in order of number from small to large, and $N_{total}$ represents the total number of users in the power distribution network.

The method further comprises (A5) identifying vulnerable links by performing sensitivity analysis through partial derivative transformation for quantifiable parameters or perturbation transformation for unquantifiable parameters on an expression of the reliability indexes.

In the step (A5), performing partial derivative transformation for quantifiable parameters specifically comprises listing a partial derivative expression, multiplying each fault parameter and each row of the $IF_1$, and performing matrix multiplication expansion; performing perturbation transformation for unquantifiable parameters specifically comprises calculating differences of the fault incidence matrix IF and the reliability indexes before and after transformation to obtain a sensitivity.

For quantifiable parameters, as shown in FIG. 2, the calculation process of the sensitivity of the SAIFI (system average interrupt frequency index) to the line failure rate $\lambda_1$ is taken as an example to explain the partial derivative transformation process. The partial derivative transformation process for the quantifiable parameters comprises listing a partial derivative expression, performing row multiplication on each fault parameter and $IF_1$, performing matrix multiplication expansion, drawing a conclusion by analyzing that partial derivative transformation is only related to the it item, and finally obtaining a result after partial derivative transformation. Similarly, the derivation process of the fault sensitivity of the remaining reliability indexes to other quantifiable parameters is similar to that shown in FIG. 2, which is not repeatedly described here. Through the above analysis, it is able to be known that after obtaining the fault incidence matrix IF, it is only necessary to assign elements in the fault incidence matrix IF and bring corresponding parameters into formulas shown in FIG. 2 to perform sensitivity analysis of any quantifiable parameter, so as to identify the vulnerable equipment that affects the reliability and avoid the repetitive calculation of the reliability indexes.

For non-quantifiable parameters, such as installation positions of section switches and fuses, and access positions of tie-lines, the change of these network structural parameters will affect the section switch matrix SE, the fuse matrix FUSE and the tie-line matrix TIE, and finally lead to the change of the fault incidence matrix IF. The fault incidence matrix IF is obtained according to the characteristic formula composed of the elements at corresponding positions of the matrix, and there is no fixed analytical relationship. Therefore, the fault incidence matrix IF before and after the change is calculated respectively, and the reliability index before and after the change is compared and the difference therebetween is calculated to obtain the sensitivity of structural influence factors of the power distribution network.

Figure 4:
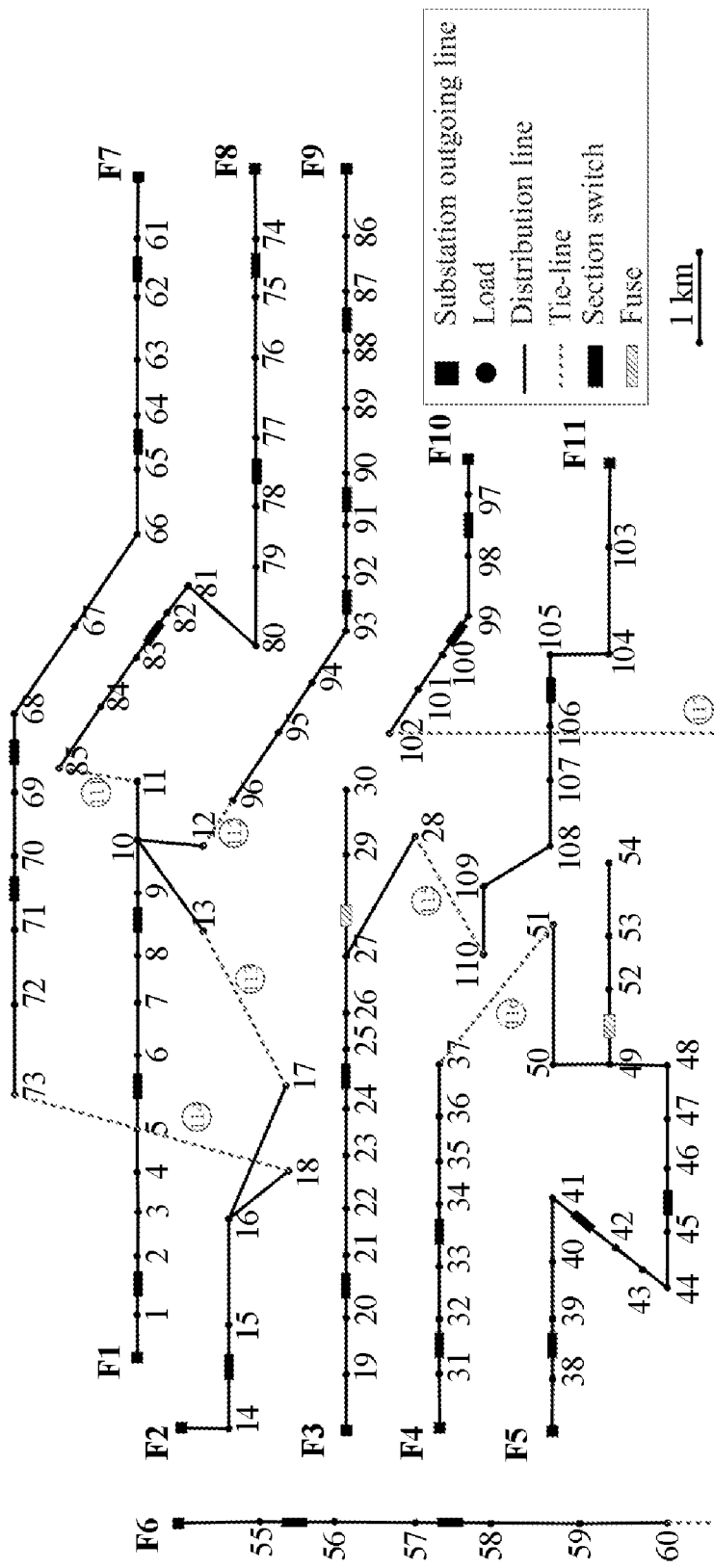
FIG. 4 is a wiring diagram of a calculation example system based on the method provided by the present invention.

FIG. 4 is a wiring diagram of a calculation example system based on the method of analytical calculation of power supply reliability indexes of the power distribution network provided by the present invention, in which Taiwan 94 node distribution network is taken as an example, the method provided by the present invention is compared with the fault diffusion method and the fault incidence matrix method in computation time, so as to verify a computational efficiency of the method provided by the present invention.

According to the step (A1), the parameters of the power distribution network are obtained. It is assumed that the model of all lines in the example is the same, the failure rate is 0.065 times/year/km, the failure repair time is 5 hours, the operation time of the section switch and the transfer time of the tie-line are 1 hour, and the number of users at each node is the same, all of which are regardless of the fault of the tie-line.

According to the step (A2), the reliability calculation model is built, which comprises treating the power distribution network as the node-branch calculation unit and numbering the nodes and branches, as shown in FIG. 4. In FIG. 4, only node numbers are marked, and branch numbers are consistent with terminal node numbers of the branches respectively.

According to the step (A3), the correlation matrices are built, and the power supply path matrix PSPM and the tie-line matrix TIE are calculated, wherein the correlation matrices are the node-branch association matrix E, the section switch matrix SE and the fuse matrix FUSE'.

According to the step (A4), according to the corresponding relationship between different characteristic formulas and different fault influence types described in Table 1, the fault incidence matrix IF is derived through the power supply path matrix PSPM, the section switch matrix SE, the fuse matrix FUSE' and the tie-line matrix TIE, and the reliability indexes of the nodes and the power distribution network are calculated according to the formulas (1) and (2).

According to the step (A5), Table 2 shows the order of the ∂SAIFI/∂λ sensitivity from largest to smallest, and discloses the first 3 groups of faulty elements whose branches have the greatest influence on the indicator SAIFI in the failure rate. It is able to be seen from Table 2 that the upstream branches 38-52 of the feeder fuse F5 have the great influence on the SAIFI index of the power distribution network. The reason is that there are no fuses between these components, once a component fails, all the loads of the feeder F5 will experience a power outage, and the feeder F5 has a large number of power users, so that the fault sensitivity of these lines is the largest. The branches 1-13 and branches 61-70 of the feeder lines F1 and F7 in the fault sensitivity are ranked second. The reason is as the same as the feeder line F5. Due to the lack of fuse isolation fault and a large number of users, the line fault has a greater influence on the index SAIFI. If the index SAIFI needs to be increased, it is necessary to reduce the failure rate of these lines by updating the equipment, or to limit the fault influence area by installing the fuse.

TABLE 2

Order of the δSAIFI/δλ sensitivity

| Sensitivity order | Faulty component | δSAIFI/δλ |
|---|---|---|
| 1 | branches 38-52 | 0.155 |
| 2 | branches 1-13, 61-70 | 0.118 |
| 3 | branches 19-29, 74-85 | 0.109 |

Compared the fault diffusion method with the method provided by the present invention, because the present invention analyzes the topological relationship of the power distribution network in detail and establishes matrices to describe the power distribution network, it is avoided that the repetitive fault search process in each fault process is enumerated by analytical calculation, and the calculation time is significantly faster. In the present invention, the positions of elements of the power distribution network are analyzed in detail and correlation matrices are built, the influence types of all fault components in all feeder lines on each load are obtained by matrix operation at one time, which avoids the calculation of feeder lines one by one. Through the formula (2), the reliability indexes of each load node and the whole power distribution network are calculated. Therefore, while ensuring the accuracy of the calculation, the calculation speed is further improved. For power distribution networks with larger scale, more feeder lines and more components, the advantages of the method provided by the present invention will be more obvious. Table 3 shows the comparison of calculation results.

TABLE 3

Comparison of calculation results

| Reliability indexes | Fault diffusion method | Fault incidence matrix method | Present invention |
|---|---|---|---|
| SAIFI (time/year) | 0.6098 | 0.6098 | 0.6098 |
| SAIDI (h/year) | 1.7243 | 1.7243 | 1.7243 |
| Calculatinon time (s) | 0.218 | 0.028 | 0.007 |

Figure 5:
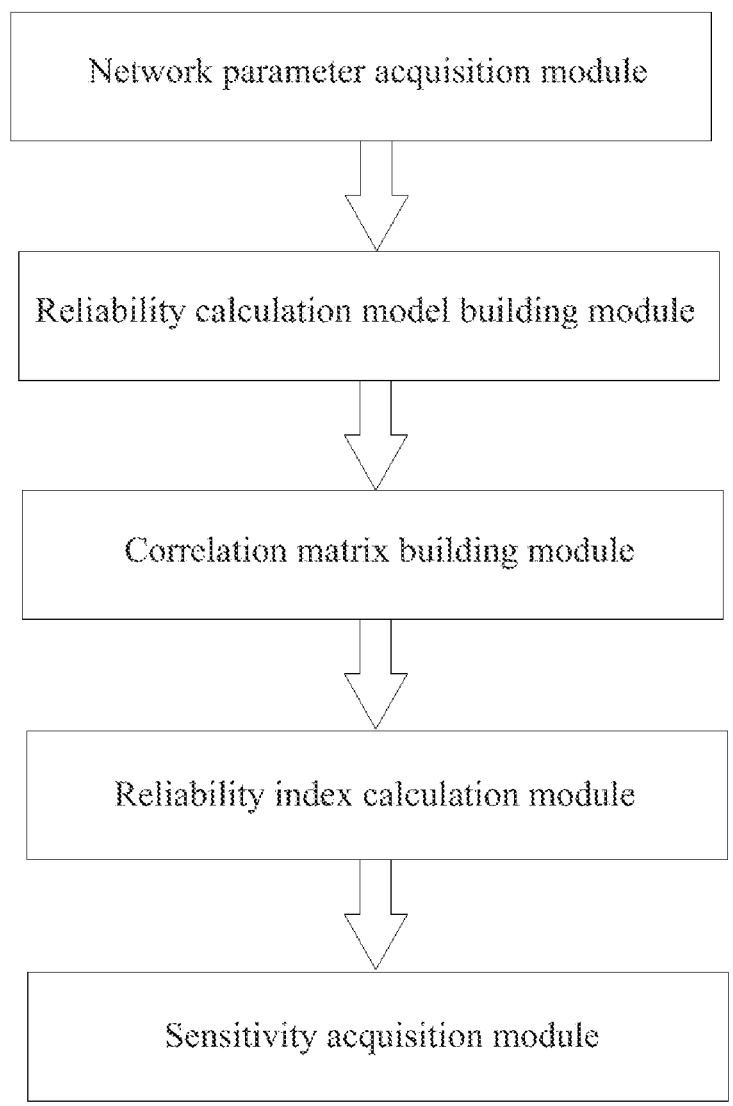
FIG. 5 is a block diagram of an analytical calculation system for reliability indexes of a power distribution network provided by the present invention.

Also, referring to FIG. 5, the present invention provides a reliability index analysis system for power distribution network, which comprises a network parameter acquisition module, a reliability calculation model building module, a correlation matrix building module, a reliability index calculation module and a sensitivity acquisition module, wherein the network parameter acquisition module is configured to obtain parameters of the power distribution network, the parameters are network topology connection relationship, failure rate, failure repair time, switch operation time and node load demand; the reliability calculation model building module is configured to treat the power distribution network as a node-branch calculation unit and number nodes and branches of the power distribution network; the correlation matrix building module is configured to build correlation matrices, and calculate a power supply path matrix PSPM and a tie-line matrix TIE, the correlation matrices are a node-branch association matrix E, a section switch matrix SE and a fuse matrix FUSE'; the reliability index calculation module is configured to derive a fault incidence matrix IF through the power supply path matrix PSPM, the section switch matrix SE, the fuse matrix FUSE' and the tie-line matrix TIE, and to calculate reliability indexes of the nodes and the power distribution network; the sensitivity acquisition module is configured to identify vulnerable links by performing a sensitivity analysis through partial derivative transformation for quantifiable parameters or perturbation transformation for unquantifiable parameters on an expression of the reliability indexes.

Further, the present invention provides a server of analytical calculation of power supply reliability indexes of a power distribution network, the server comprises a memory and a processor, wherein the memory is configured to store a computer program, and the processor is configured to analyze and calculate the reliability indexes of the power distribution network while executing the computer program stored in the memory.

Further, the present invention provides a terminal of analytical calculation of power supply reliability indexes of a power distribution network, the terminal comprises a memory and a processor, wherein the memory is configured to store a program which supports the processor to analyze and calculate the reliability indexes of the power distribution network, and the processor is configured to execute the program stored in the memory.

The above are only better embodiments of the present invention and are not intended to limit the present invention. Any modifications, equivalent replacements and improvements made within the spirit and principles of the present invention should be included in the protective scope of the present invention.

What is claimed is:

1. A reliability evaluation method of a power distribution network, wherein the reliability evaluation method is executed by a processor of a device for analyzing and calculating reliability indexes of the power distribution network, and the reliability evaluation method comprises steps of:
(A1) acquiring parameters of the power distribution network, wherein the parameters are network topology connection relationship, failure rate, failure repair time, switch operation time and node load demand;
(A2) building a reliability calculation model, which comprises treating the power distribution network as a node-branch calculation unit, and numbering nodes and branches in the power distribution network, wherein:
the reliability calculation model is a node-branch association model, section switches and fuses are regarded as special branches, two ends of each of branches are respectively connected with two load nodes, the each of branches is provided between every two adjacent load nodes; if there is no load node at one end of one of the branches, a load node where both the number of users and node load demand are zero is added;
(A3) building correlation matrices, and calculating a power supply path matrix and a tie-line matrix, wherein the correlation matrices are a node-branch association matrix, a section switch matrix and a fuse matrix;
(A4) deriving a fault incidence matrix IF through the power supply path matrix, the section switch matrix, the fuse matrix and the tie-line matrix, and calculating the reliability indexes of the power distribution network, wherein:
a matrix on a main diagonal of the fault incidence matrix IF is obtained through relationship between characteristic formulas and fault influence types in a table as follows:

| | | | |
|---|---|---|---|
| a: (0, 0, 0, 0) | b: (0, 1, 0, 0) | a: (1, 0, 0, 0) | a: (1, 1, 0, 0) |
| a: (0, 0, 0, 1) | b: (0, 1, 0, 1) | a: (1, 0, 0, 1) | c: (1, 1, 0, 1) |
| a: (0, 0, 1, 0) | b: (0, 1, 1, 0) | a: (1, 0, 1, 0) | a: (1, 1, 1, 0) |
| a: (0, 0, 1, 1) | b: (0, 1, 1, 1) | a: (1, 0, 1, 1) | c: (1, 1, 1, 1) |
| d: (0, 0, −1, 0) | d: (0, 1, −1, 0) | x (1, 0, −1, 0) | x (1, 1, −1, 0) |
| d: (0, 0, −1, 1) | d: (0, 1, −1, 1) | x (1, 0, −1, 1) | x (1, 1, −1, 1) | here, "x" indicates an impossible characteristic formula;

here, "x" indicates an impossible characteristic formula;
there are four influence types of a branch fault on the load node, the four influence types are type-a, type-b, type-c and type-d respectively; type-a means that all power supply paths of a load are disconnected when the branch fault occurs, and the load is restored to be supplied only after the branch fault is repaired; type-b means that all power supply paths of the load are disconnected when the branch fault occurs, and the load is restored to be supplied by a main power supply after the branch fault is isolated; type-c means that all power supply paths of the load are disconnected when the branch fault occurs, the load is restored to be supplied by a standby power supply; and type-d means that the branch fault has no effect on the load node; and (A5) identifying vulnerable links which affect reliability of the power distribution network by performing sensitivity analysis through partial derivative transformation for quantifiable parameters or perturbation transformation for unquantifiable parameters on an expression of the reliability indexes, thereby avoiding repetitive calculation of the reliability indexes and achieving reliability evaluation of the power distribution network.

2. The reliability evaluation method according to claim 1, wherein the step (A3) specifically comprises:

(A31) according to the node-branch association model, searching all the nodes and branches of the power distribution network by depth first search algorithm once and simultaneously determining a branch direction of an oriented graph, numbering the nodes and the branches, writing the node-branch association matrix, and partitioning the node-branch association matrix according to feeder lines, wherein elements of the node-branch association matrix are defined as $e_{ij}$ which has three values of −1, 0 and 1, when a node i is disconnected from a branch j, $e_{ij}=0$; when the node i is a starting point of the branch j, $e_{ij}=1$; when the node i is a terminal point of the branch j, $e_{ij}=−1$;

(A32) obtaining the power supply path matrix of all load nodes, which comprises based on the node-branch association matrix, deleting a row corresponding to a power node and a column corresponding to a tie-line, and performing matrix inversion; and (A33) according to locations of components in the power distribution network, writing the section switch matrix and the fuse matrix, and calculating the tie-line matrix based on the section switch matrix, the fuse matrix and the node-branch association matrix.

3. The reliability evaluation method according to claim 1, wherein the step (A4) specifically comprises:
according to elements at corresponding positions of the node-branch association matrix, the section switch matrix, the fuse matrix and the tie-line matrix, determining an influence type of any branch fault on any node;
setting a row vector consisting of failure rates of N branches in the power distribution network as $\lambda=[\lambda_1\ \lambda_2\ \lambda_3\ \ldots\ \lambda_N]$, a row vector consisting of failure repair time of the N branches in the power distribution network as $\mu=[\mu_1\ \mu_2\ \mu_3\ \ldots\ \mu_N]$, a row vector consisting of node load demands in the power distribution network as $L=[L_1\ L_2\ L_3\ \ldots\ L_N]$, a row vector consisting of node interruption frequency indexes caused by the branch fault as $\lambda^{LP}$ $[\lambda_1^{L\ P}\ \lambda_2^{L\ P}\ \lambda_3^{L\ P}\ \ldots\ \lambda_N^{L\ P}]$, a row vector consisting of node interruption duration indexes as $\mu^{LP}=[\mu_1^{L\ P}\ \mu_2^{L\ P}\ \mu_3^{L\ P}\ \ldots\ \mu_N^{L\ P}]$, and a row vector consisting of node power loss indexes as $ens^{LP}=[ens_1^{L\ P}\ ens_2^{L\ P}\ ens_3^{L\ P}\ \ldots\ ens_N^{L\ P}]$, all of which are calculated by matrix operations as follows:

$$\begin{cases} \lambda^{LP} = [1\ 1\ \ldots\ 1] \times \mathrm{diag}(\lambda_1\ \lambda_2\ \ldots\ \lambda_N) \times IF_1 \\ \mu^{LP} = [1\ 1\ \ldots\ 1] \times \mathrm{diag}(\lambda_1\ \lambda_2\ \ldots\ \lambda_N) \times IF_2 \\ \quad ens^{LP} = \mu^{LP} \circ L \\ IF_2 = \mathrm{diag}(\mu_1\ \mu_2\ \ldots\ \mu_N) \times IF_3 + IF_4 \end{cases} \quad (1)$$

here, $[1\ 1\ \ldots\ 1]$ represents an N-dimensional row vector whose elements are all 1, an operative symbol "∘" represents Hadamard product, and an operational rule is to multiply elements at corresponding positions of matrices or vectors, wherein:
during calculating $\lambda^{LP}$, the IF matrix is transformed according to following rules that: a value of 1 is assigned to positions in the IF matrix where an element corresponds to 'type-a', 'type-b' or 'type-c', and a value of 0 is assigned to positions where an element corresponds to 'type-d'; the transformed IF matrix is defined as an $IF_1$ matrix, here, an element at the $i^{th}$ row and $j^{th}$ column in the $IF_1$ matrix represents an interruption frequency at a node j when a branch i fails; while calculating $\mu^{LP}$, an $IF_2$ matrix is obtained through calculation of an $IF_3$ matrix and an $IF_4$ matrix;
the $IF_3$ matrix is obtained by assigning a value of 1 to positions in the IF matrix where the element corresponds to 'type-a', and assigning a value of 0 to positions where the element corresponds to 'type-b', 'type-c' or 'type-d', so that the transformed IF matrix is defined as the $IF_3$ matrix, here, an element at the $i^{th}$ row and $j^{th}$ column in the $IF_3$ matrix represents an interruption duration at the node j due to the type-a influence when the branch i fails;
the $IF_4$ matrix is obtained by assigning a value of $t_{sw}$ to positions in the IF matrix where the element corresponds to 'type-b', assigning a value of $\max\{t_{sw}, t_{op}\}$ to positions where the element corresponds to 'type-c', and assigning a value of 0 to positions where the element corresponds to 'type-a' and 'type-d', so that the transformed IF matrix is defined as the $IF_4$ matrix, here, an element at the $i^{th}$ row and $j^{th}$ column in the $IF_4$ matrix represents an interruption duration at the node j due to the type-b and type-c influences when the branch i fails, $t_{sw}$ represents an operation time of a section switch, and $t_{op}$ represents an operation time of a tie switch; and calculating the reliability indexes of the power distribution network by a formula of:

$$\begin{cases} SAIFI = \lambda^{LP} \times \dfrac{N^T}{N_{total}} \\ SAIDI = \mu^{LP} \times \dfrac{N^T}{N_{total}} \\ EENS = \sum ens_i^{LP} = \mu^{LP} \times L^T \end{cases} \quad (2)$$

here, $N^T$ represents a column vector consisting of the number of users at each load node arranged in order of number from small to large, and $N_{total}$ represents the total number of users in the power distribution network.

4. The reliability evaluation method according to claim 1, wherein in the step (A5), performing partial derivative transformation for quantifiable parameters specifically comprises listing a partial derivative expression, multiplying each fault parameter and each row of the $IF_1$, and performing matrix multiplication expansion; performing perturbation transformation for unquantifiable parameters comprises calculating differences of the fault incidence matrix IF and the reliability indexes before and after transformation to obtain a sensitivity.

5. A system of analytical calculation of power supply reliability indexes of a power distribution network, the system comprising a network parameter acquisition module, a reliability calculation model building module, a correlation matrix building module, a reliability index calculation module and a sensitivity acquisition module, wherein:

the network parameter acquisition module is configured to obtain parameters of the power distribution network, the parameters are network topology connection relationship, failure rate, failure repair time, switch operation time and node load demand;

the reliability calculation model building module is configured to treat the power distribution network as a node-branch calculation unit, and number nodes and branches of the power distribution network, wherein:

a reliability calculation model is a node-branch association model, wherein section switches and fuses are regarded as special branches, two ends of each of branches are respectively connected with two load nodes, the each of branches is provided between every two adjacent load nodes; if there is no load node at one end of one of the branches, a load node where both the number of users and node load demand are zero is added;

the correlation matrix building module is configured to build correlation matrices, and calculate a power supply path matrix and a tie-line matrix, the correlation matrices are a node-branch association matrix, a section switch matrix and a fuse matrix, wherein:

according to the node-branch association model, all the nodes and branches of the power distribution network are searched by depth first search algorithm once and simultaneously a branch direction of an oriented graph is determined, the nodes and the branches are numbered, the node-branch association matrix is written, and the node-branch association matrix is partitioned according to feeder lines, wherein elements of the node-branch association matrix are defined as $e_{ij}$ which has three values of $-1$, 0 and 1, when a node i is disconnected from a branch j, $e_{ij}=0$; when the node i is a starting point of the branch j, $e_{ij}=1$; when the node i is a terminal point of the branch j, $e_{ij}=-1$;

the power supply path matrix of all load nodes is obtained by deleting a row corresponding to a power node and a column corresponding to a tie-line based on the node-branch association matrix, and performing matrix inversion;

according to locations of components in the power distribution network, the section switch matrix and the fuse matrix are written, and the tie-line matrix is calculated based on the section switch matrix, the fuse matrix and the node-branch association matrix;

the reliability index calculation module is configured to derive a fault incidence matrix through the power supply path matrix, the section switch matrix, the fuse matrix and the tie-line matrix, and to calculate reliability indexes of the nodes and the power distribution network, wherein:

a matrix on a main diagonal of the fault incidence matrix IF is obtained through relationship between characteristic formulas and fault influence types in a table as follows:

| | | | |
|---|---|---|---|
| a: (0, 0, 0, 0) | b: (0, 1, 0, 0) | a: (1, 0, 0, 0) | a: (1, 1, 0, 0) |
| a: (0, 0, 0, 1) | b: (0, 1, 0, 1) | a: (1, 0, 0, 1) | c: (1, 1, 0, 1) |
| a: (0, 0, 1, 0) | b: (0, 1, 1, 0) | a: (1, 0, 1, 0) | a: (1, 1, 1, 0) |
| a: (0, 0, 1, 1) | b: (0, 1, 1, 1) | a: (1, 0, 1, 1) | c: (1, 1, 1, 1) |
| d: (0, 0, −1, 0) | d: (0, 1, −1, 0) | x (1, 0, −1, 0) | x (1, 1, −1, 0) |
| d: (0, 0, −1, 1) | d: (0, 1, −1, 1) | x (1, 0, −1, 1) | x (1, 1, −1, 1) | here, "x" indicates an impossible characteristic formula;

here, "x" indicates an impossible characteristic formula;

there are four influence types of a branch fault on the load node, the four influence types are type-a, type-b, type-c and type-d respectively; type-a means that all power supply paths of a load are disconnected when the branch fault occurs, and the load is restored to be supplied only after the branch fault is repaired; type-b means that all power supply paths of the load are disconnected when the branch fault occurs, and the load is restored to be supplied by a main power supply after the branch fault is isolated; type-c means that all power supply paths of the load are disconnected when the branch fault occurs, the load is restored to be supplied by a standby power supply; and type-d means that the branch fault has no effect on the load node;

according to elements at corresponding positions of the node-branch association matrix, the section switch matrix, the fuse matrix and the tie-line matrix, an influence type of any branch fault on any node is determined;

a row vector consisting of failure rates of N branches in the power distribution network as $\lambda=[\lambda_1\ \lambda_2\ \lambda_3\ \ldots\ \lambda_N]$, a row vector consisting of failure repair time of the N branches in the power distribution network as $\mu=[\mu_1\ \mu_2\ \mu_3\ \ldots\ \mu_N]$, a row vector consisting of node load demands in the power distribution network as $L=[L_1\ L_2\ L_3\ \ldots\ L_N]$, a row vector consisting of node interruption frequency indexes caused by the branch fault as $\lambda^{LP}=[\lambda_1^{L\ P}\ \lambda_2^{L\ P}\ \lambda_3^{L\ P}\ \ldots\ \lambda_N^{L\ P}]$, a row vector consisting of node interruption duration indexes as $\mu^{LP}=[\mu_1^{L\ P}\ \mu_2^{L\ P}\ \mu_3^{L\ P}\ \ldots\ \mu_N^{L\ P}]$, and a row vector consisting of node power loss indexes as $ens^{LP}=$ $[ens_1^{LP}\ ens_2^{LP}\ ens_3^{LP}\ \ldots\ ens_N^{LP}]$ are set, all of which are calculated by matrix operations as follows:

$$\begin{cases} \lambda^{LP} = [1\ 1\ \cdots\ 1] \times \text{diag}(\lambda_1\ \lambda_2\ \cdots\ \lambda_N) \times IF_1 \\ \mu^{LP} = [1\ 1\ \cdots\ 1] \times \text{diag}(\lambda_1\ \lambda_2\ \cdots\ \lambda_N) \times IF_2 \\ ens^{LP} = \mu^{LP} \circ L \\ IF_2 = \text{diag}(\mu_1\ \mu_2\ \cdots\ \mu_N) \times IF_3 + IF_4 \end{cases} \quad (1)$$

here, [1 1 . . . 1] represents an N-dimensional row vector whose elements are all 1, an operative symbol "∘" represents Hadamard product, and an operational rule is to multiply elements at corresponding positions of matrices or vectors, wherein:

during calculating $\lambda^{LP}$, the IF matrix is transformed according to following rules that: a value of 1 is assigned to positions in the IF matrix where an element corresponds to 'type-a', 'type-b' or 'type-c', and a value of 0 is assigned to positions where an element corresponds to 'type-d'; the transformed IF matrix is defined as an $IF_1$ matrix, here, an element at the $i^{th}$ row and $i^{th}$ column in the $IF_1$ matrix represents an interruption frequency at a node j when a branch i fails; while calculating $\mu^{LP}$, an $IF_2$ matrix is obtained through calculation of an $IF_3$ matrix and an $IF_4$ matrix;

the $IF_3$ matrix is obtained by assigning a value of 1 to positions in the IF matrix where the element corresponds to 'type-a', and assigning a value of 0 to positions where the element corresponds to 'type-b', 'type-c' or 'type-d', so that the transformed IF matrix is defined as the $IF_3$ matrix, here, an element at the $i^{th}$ row and $j^{th}$ column in the $IF_3$ matrix represents an interruption duration at the node j due to the type-a influence when the branch i fails;

the $IF_4$ matrix is obtained by assigning a value of $t_{sw}$ to positions in the IF matrix where the element corresponds to 'type-b', assigning a value of max $\{t_{sw}, t_{op}\}$ to positions where the element corresponds to 'type-c', and assigning a value of 0 to positions where the element corresponds to 'type-a' and 'type-d', so that the transformed IF matrix is defined as the $IF_4$ matrix, here, an element at the $i^{th}$ row and $i^{th}$ column in the $IF_4$ matrix represents an interruption duration at the node j due to the type-b and type-c influences when the branch i fails, $t_{sw}$ represents an operation time of a section switch, and $t_{op}$ represents an operation time of a tie switch;

the reliability indexes of the power distribution network are calculated by a formula of:

$$\begin{cases} SAIFI = \lambda^{LP} \times \dfrac{N^T}{N_{total}} \\ SAIDI = \mu^{LP} \times \dfrac{N^T}{N_{total}} \\ EENS = \sum ens_i^{LP} = \mu^{LP} \times L^T \end{cases} \quad (2)$$

here, $N^T$ represents a column vector consisting of the number of users at each load node arranged in order of number from small to large, and $N_{total}$ represents the total number of users in the power distribution network the sensitivity acquisition module is configured to perform sensitivity analysis through partial derivative transformation for quantifiable parameters or perturbation transformation for unquantifiable parameters on an expression of the reliability indexes to identify vulnerable links, wherein performing partial derivative transformation for quantifiable parameters specifically comprises listing a partial derivative expression, multiplying each fault parameter and each row of the $IF_1$, and performing matrix multiplication expansion; performing perturbation transformation for unquantifiable parameters comprises calculating differences of the fault incidence matrix IF and the reliability indexes before and after transformation to obtain a sensitivity.

6. A server of analytical calculation of power supply reliability indexes of a power distribution network, the server comprising a memory and a processor, wherein the memory is configured to store a computer program, and the processor is configured to perform the method of analytical calculation of the power supply reliability indexes of the power distribution network according to claim 1 while executing the computer program stored in the memory.

\* \* \* \* \*